H. W. LOWE.
STERILIZING APPARATUS.
APPLICATION FILED NOV. 18, 1912.

1,151,023.  Patented Aug. 24, 1915.

Harry W. Lowe, Inventor.

Witnesses
Roy G. Kratz
A. R. Mitchell

By David O. Barnell,
Attorney

UNITED STATES PATENT OFFICE.

HARRY W. LOWE, OF FLORENCE, NEBRASKA.

STERILIZING APPARATUS.

1,151,023.   Specification of Letters Patent.   Patented Aug. 24, 1915.

Application filed November 18, 1912. Serial No. 732,169.

*To all whom it may concern:*

Be it known that I, HARRY W. LOWE, a citizen of the United States, and a resident of Florence, in the county of Douglas and State of Nebraska, have invented certain new and useful Improvements in Sterilizing Apparatus, of which the following is a specification.

My invention relates to preserving, sterilizing or cooking apparatus, and especially to machines for manipulating sheet-metal cans or similar sealed vessels containing fruits, vegetables or the like, which are heat-treated after sealing, in order to sterilize or to cook their contents.

My invention provides a crate or basket for holding a plurality of vessels of the described class during the heat-treatment thereof, and while the same are being placed in and taken out of the heating apparatus.

It is the object of my invention to provide a receptacle for holding a plurality of cans or like vessels while the same are surrounded by a heating medium, the receptacle having means by which a simple longitudinal movement given thereto will cause each of the cans therein to be rotated so that the various parts of the can-contents will be successively brought to a position adjoining the surface thereof and subjected directly to the action of the heating medium, thus facilitating and reducing the time necessary for the completion of the heating operation, and at the same time avoiding the necessity of overheating any part of the contents of the cans in order to properly sterilize or cook the part lying remote from the surface.

A structure embodying my invention is illustrated in the accompanying drawing, in which—

Figure 1:
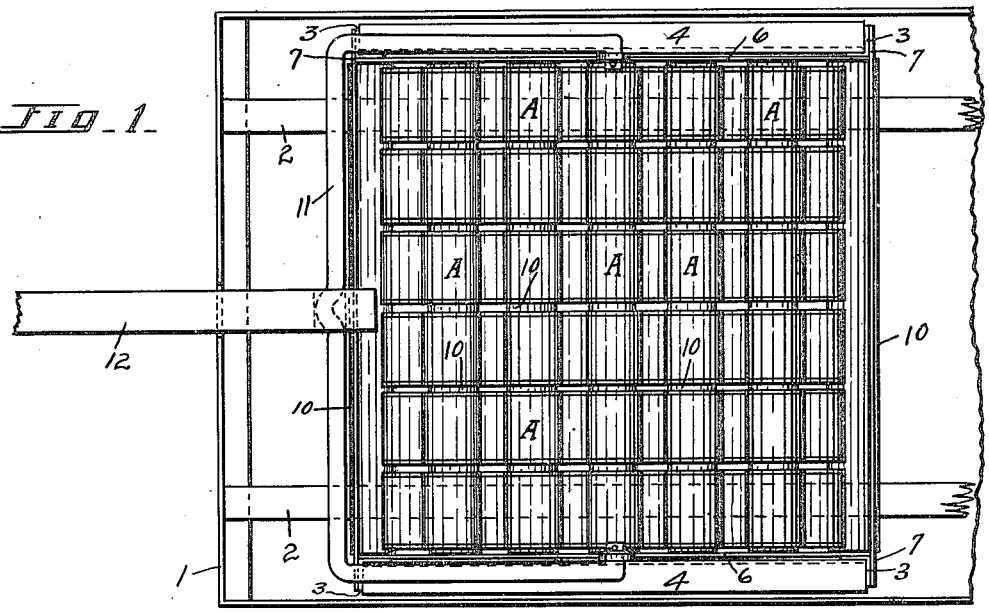
Figure 2:
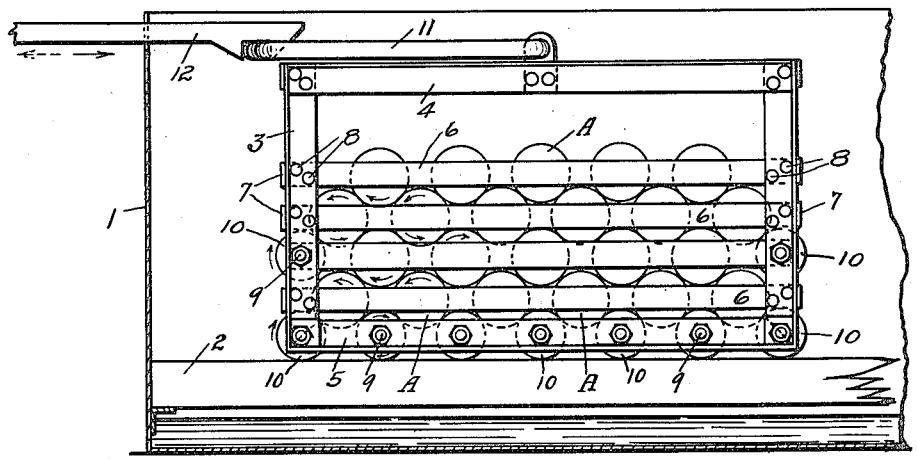

Figure 1 is a plan view and Fig. 2 is a longitudinal vertical section of the heating vessel, showing the basket or crate in elevation.

My invention is especially applicable for use in heat-treating fluid, semi-fluid or plastic materials contained in sheet-metal cans of cylindrical form or circular cross-section.

In the drawings I have shown a part only of a vessel 1 for retaining a suitable heating medium, such as water. The vessel shown is open at the top, but it will be understood that a closed vessel might be employed where the heating medium to be employed is gaseous, as, for instance, where the sterilization or cooking is done with live steam. It will also be understood that the heat applied through the chosen medium may be derived from any suitable source.

Within the heating vessel 1 are disposed horizontal rails 2 for supporting the receptacle for the cans. The said receptacle, in the structure shown, has a rectangular metal framework comprising vertical corner-pieces 3 and horizontal upper and lower end-pieces 4 and 5, made of angle-iron, and horizontal end-bars 6 and side-bars 7, the horizontal members being secured to the corner-members by suitable rivets or bolts 8. Across the bottom of the frame between the lower end-pieces 5, and at the sides of the frame between the corner-pieces 3, are rods 9 on which are rotatably disposed rollers 10. To the upper end-pieces 4 are secured suitable lugs with which the ends of a bail 11 are pivotally connected. The rollers 10 at the bottom of the receptacle extend below the lower edges of the frame so that when the receptacle is placed within the heating vessel said rollers rest upon the rails 2. The bail 11 may be used for lifting the receptacle into and out of the heating vessel, being then turned to a vertical position. When the receptacle is in place upon the rails 2 the bail is turned to a horizontal position and is engaged by a hook formed at the end of a bar 12, as shown. A longitudinal reciprocating movement is imparted to the bar 12 by suitable means.

The cams A are placed within the receptacle as shown in Fig. 2, being supported entirely by the rollers 10, and having a quincuncial arrangement such that those of the horizontal and vertical rows are spaced apart while those forming the diagonal rows are in rolling contact with each other. The cans forming each horizontal layer, being spaced from each other, may all be revolved in the same direction without causing their adjacent oppositely-moving surfaces to rub together. As the receptacle is moved longitudinally upon the rails 2 by the bar 12, the rollers engaging the rails are caused to revolve. The rotation of said rollers actuates the cans in the lower horizontal layer, revolving them in directions opposite to the direction of rotation of the rollers, and each succeeding layer of the cans is similarly revolved by the movement of the cans in the layer beneath them, the relative directions of rotation being as indicated by arrows in Fig. 2.

The rollers 10 might be employed only at the bottom of the receptacle, in which event the cans would be placed in a pyramidal pile, or so that each succeeding layer would contain one row less than the layer below it. It is preferable, however, to have one of the rollers 10 at each end of the receptacle, as shown, and said rollers serve to revolubly support the end-rows of cans of the third layer from the bottom of the receptacle. Thus the receptacle may be completely filled with the cans and each be revolubly supported, either upon a pair of the rollers as are the cans of the bottom layer, or upon a pair of other cans as are the cans of the second and fourth layers, or upon one roller and one other can as are those which engage the end-rollers.

Now, having described my invention, what I claim and desire to secure by Letters Patent is:

1. The combination with a heating vessel and horizontal rails disposed therein, of a receptacle comprising a frame, and rollers journaled therein, some of said rollers being adapted to rest upon the horizontal rails, the several rollers being adapted to revolubly support a plurality of cylindrical containers, and means for moving the receptacle longitudinally of the rails.

2. In a device of the class described, a framework, rollers journaled therein and adapted to support a plurality of quincuncially arranged cylindrical vessels, track-rails engaging some of the rollers, and means for moving the frame-work longitudinally of the rails to rotate the rollers.

3. In a sterilizing apparatus, a horizontal track, a frame, a series of horizontally-spaced rollers journaled in the frame, said rollers engaging the track and being adapted to support a layer of horizontally-disposed cylindrical vessels in non-contacting rows, means on the frame for partially supporting and retaining in position similar layers of cylindrical vessels each disposed parallel with and in contact with the vessels of the layer beneath them, and means for moving the frame relatively to the track to revolve the rollers and thereby rotate the vessels of the contacting layers.

4. In apparatus of the class described, a heating vessel, a basket for holding cans within the heating vessels, the basket having a plurality of parallel rollers at the bottom thereof adapted to support therein rows of cans quincuncially arranged and spaced apart in planes parallel to the plane of the rollers, means engaging the rollers to support the basket, and means for moving the basket relative to the supporting means to revolve the rollers.

In testimony whereof I have hereunto subscribed my name in the presence of two witnesses.

HARRY W. LOWE.

Witnesses:
D. O. BARNELL,
A. R. MITCHELL.